No. 759,630. PATENTED MAY 10, 1904.
A. A. PAGE.
SNAP HOOK.
APPLICATION FILED JUNE 17, 1898.
NO MODEL.

Witnesses.
J. F. Coleman
C. W. Adams

Inventor.
Albert A. Page,
by Samuel W. Fish
Attorney.

No. 759,630. Patented May 10, 1904.

UNITED STATES PATENT OFFICE.

ALBERT A. PAGE, OF EAST HAVEN, CONNECTICUT, ASSIGNOR TO THE SARGENT & COMPANY, OF NEW HAVEN, CONNECTICUT, A CORPORATION OF CONNECTICUT.

SNAP-HOOK.

SPECIFICATION forming part of Letters Patent No. 759,630, dated May 10, 1904.

Application filed June 17, 1898. Serial No. 683,685. (No model.)

*To all whom it may concern:*

Be it known that I, ALBERT A. PAGE, of the town of East Haven, in the county of New Haven, in the State of Connecticut, have invented a new and useful Improvement in Snap-Hooks, of which the following is a full, clear, and exact description when taken in connection with the accompanying drawings, which form a part thereof, and in which—

Figure 1:
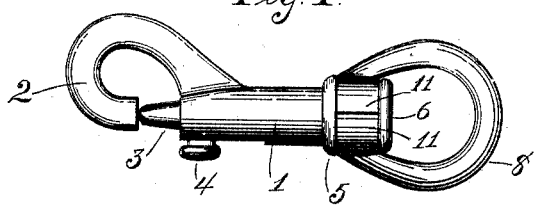
Figure 2:
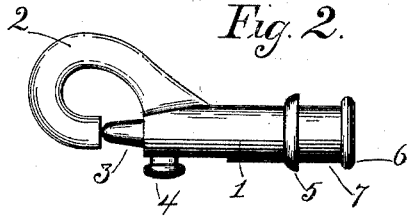
Figure 3:
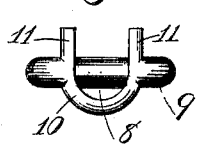
Figure 4:
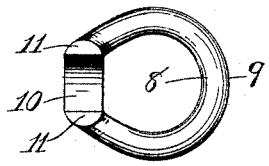

Figure 1 represents a side elevation of a snap-hook embodying the invention; Fig. 2, a similar view with the loop omitted, and Figs. 3 and 4 side and end views of the loop taken by itself and before assemblage with the shank.

In all figures similar numerals of reference represent like parts.

This invention relates to snap-hooks, and has for its object the production of a novel construction in snap-hooks formed of cast metal, as more fully set forth hereinafter.

In the drawings the part designated by the numeral 1 represents the shank of the hook, 2 the hook proper, and 3 the bolt thereof, with the knob 4, which operate in the shank in well-known manner. The shank is provided at its rear end with two annular flanges 5 and 6, making an annular recess or groove 7 for the assemblage of the loop or eye 8. The loop 8 is made of cast metal in the form shown in Figs. 3 and 4, having a loop portion 9 and substantially semicircular part 10 at right angles to the plane of the loop portion 9. The sides of the part 10 are prolonged into ears 11, and the internal diameter of the part 10 corresponds to the diameter of the annular groove 7 of the shank 1.

To assemble the parts, the groove 7 is fitted into the semicircular part 10 of the loop 8, and the ears are turned down toward each other to complete a ring around the groove 7, Fig. 1. The loop is therefore free to turn on the line of the axis of the shank, while the flanges 5 and 6 prevent longitudinal movement, and, moreover, the use of the core-print is obviated in the making of the loop to provide a swivel-joint between the loop and shank.

Having now described my invention, what I claim, and desire to secure by Letters Patent, is—

In a snap-hook, a combination with a hollow cylindrical shank, having at one end a hook, and at the other end, an annular groove on the outer surface of said hollow shank with integral lateral ribs or flanges above and below said groove; a bolt operating within the hollow interior of said shank; and a separate loop portion, having a substantially semicircular engaging part fitting in said annular groove with laterally-extending ears or projections from each end of said semicircular part, said loop portion being secured to said hook by said ears or projections being turned toward each other to complete with said semicircular part a ring within said groove, substantially as described.

In witness whereof I have hereunto set my hand this 14th day of June, A. D. 1898.

ALBERT A. PAGE.

Witnesses:
 WILLIAM S. COOKE,
 CHARLES L. BALDWIN.